United States Patent [19]

Branch

[11] Patent Number: 5,305,896
[45] Date of Patent: Apr. 26, 1994

[54] APPARATUS FOR SEPARATING CROSSED GARMENT HANGERS

[76] Inventor: Thomas R. Branch, 6 Sterling Ct., Cartersville, Ga. 30120

[21] Appl. No.: 943,862

[22] Filed: Sep. 11, 1992

Related U.S. Application Data

[63] Continuation-in-part of PCT/US91/09802, Dec. 27, 1991.
[51] Int. Cl.$^5$ .............................................. B07C 5/36
[52] U.S. Cl. .................................. 209/616; 198/459; 198/465.4; 198/659; 209/617; 209/618; 209/911; 209/937
[58] Field of Search ............... 209/539, 615, 616, 617, 209/618, 911, 937; 198/459, 465.4, 659

[56] References Cited

U.S. PATENT DOCUMENTS

| 4,566,583 | 1/1986 | Schneider | 198/459 |
| 4,875,416 | 2/1989 | Duce | 198/465.4 |
| 5,154,275 | 10/1992 | Speckhart et al. | 198/465.4 X |

FOREIGN PATENT DOCUMENTS

| 0372906 | 6/1990 | European Pat. Off. | 209/937 |
| 1408277 | 7/1965 | France | 198/659 |
| 0126020 | 6/1987 | Japan | 198/459 |
| 2076351 | 12/1981 | United Kingdom | 198/465.4 |

Primary Examiner—Andres Kashnikow
Assistant Examiner—Joseph A. Kaufman
Attorney, Agent, or Firm—Jason A. Bernstein

[57] ABSTRACT

An apparatus for detangling a plurality of conventional garment hangers located on a common supporting rail, comprising a generally cylindrical elongated rigid barrel having a plurality of spaced elongated bristles fixedly attached to the barrel projecting radially from the surface of the barrel, the bristles being spaced substantially around the circumference of the barrel; and, a motor for rotating the barrel about its axis. Hangers presented to the apparatus, such as by a conveyor, are supported by the barrel. The bristles turn in the direction of the hanger hook curve and any crossed hangers are automatically combed apart and separated. The hangers are moved from the front end toward and off the rear end of the barrel during rotation.

21 Claims, 1 Drawing Sheet

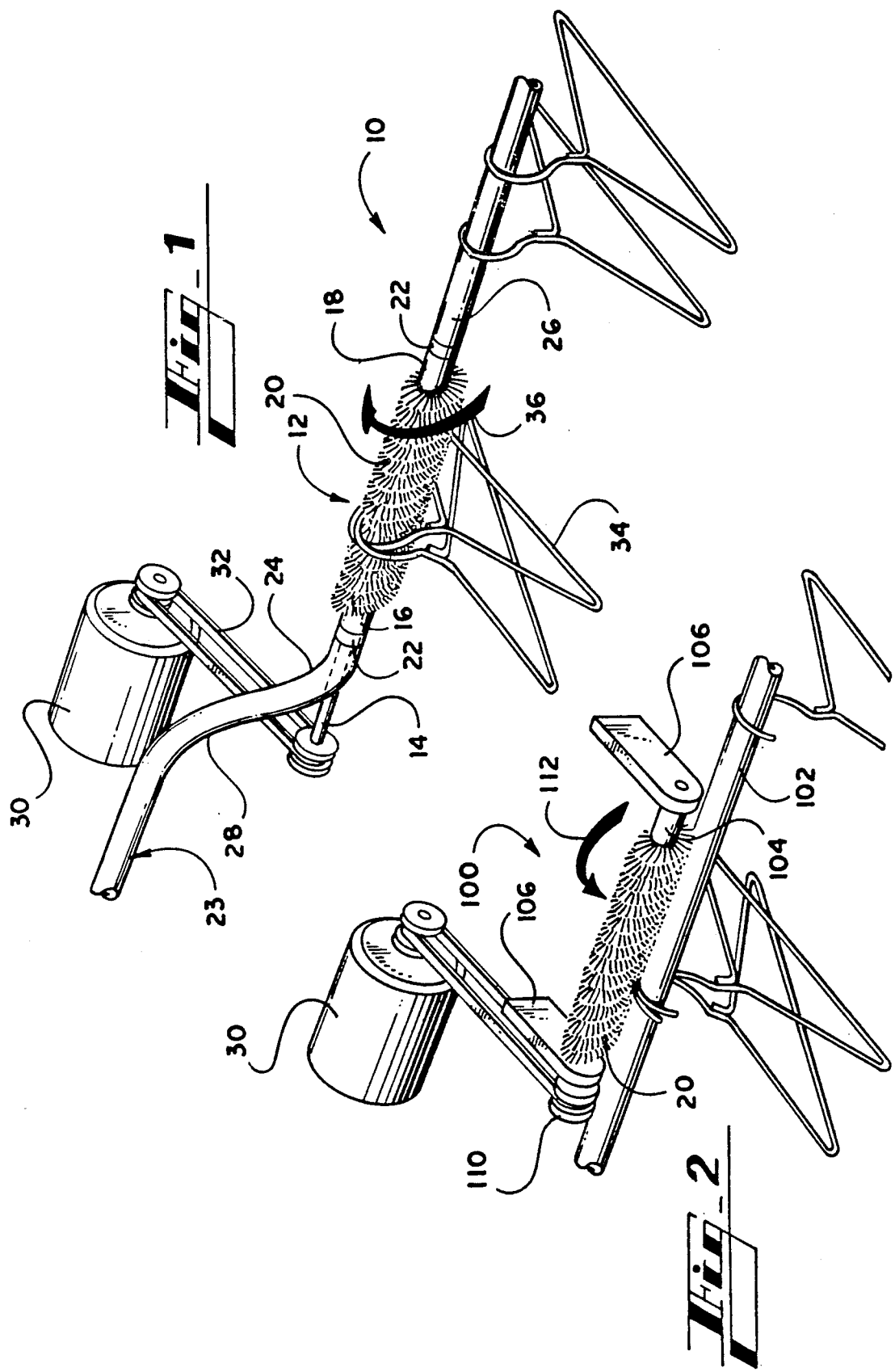

APPARATUS FOR SEPARATING CROSSED GARMENT HANGERS

This is a continuation-in-part of co-pending application Ser. No. PCT/US91/09802, filed Dec. 27, 1991.

FIELD OF THE INVENTION

The present invention relates to an apparatus for separating crossed garment hangers located on a common rail or other support means.

BACKGROUND OF THE INVENTION

The garment cleaning and sortation industry processes thousands of garments in a day at a given location, using large conveyors to transport cleaned garments on conventional wire hangers. Frequently, these hangers are moving in close proximity to each other without any mechanical separation means employed. With many hangers being moved along a conveyor, the hangers have a propensity for getting crossed, making separation problematic. This is especially troublesome where large sortation apparatus is used where the garments are individually identified and sorted. If the hangers are crossed, the apparatus must be stopped to uncross and separate the hangers manually, otherwise, two garments may be identified as one or the apparatus may malfunction. It would be desirable to have a means for automatically separating crossed hangers that can be integrated with a sortation apparatus. It would also be desirable for such a detangling means to be usable with conventional hanger support rails or conveyors.

SUMMARY OF THE INVENTION

The present invention remedies the deficiencies in the prior art and provides an apparatus for automatically separating crossed wire hangers. More particularly, the present invention comprises an apparatus for separating a plurality of conventional garment hangers located on a common supporting means, comprising a generally cylindrical elongated rigid barrel having a plurality of spaced elongated bristles fixedly attached to the barrel projecting radially from the surface of the barrel, the bristles being spaced substantially around the circumference of the barrel; and, a means for rotating the barrel about the barrel axis.

The bristles are a number of preferably flexible members that interpose between the hangers to gently separate them when the apparatus is rotated about its axis. The direction of rotation is preferably in the same direction as the curve of the hanger; i.e., from the center of the hanger hook to the tip.

A motor is attached to the barrel by a shaft and rotates the barrel on its axis.

In a preferred embodiment the apparatus is positioned at a downwardly sloping angle from the front end to the rear end so that hangers coming onto the front end of the barrel are moved toward the rear end by gravity as the barrel rotates. The invention can be integrated with an automatic sortation apparatus.

Accordingly, it is a principal object of the present invention to provide an apparatus for automatically detangling crossed hangers.

It is another object of the present invention to provide a barrel with a plurality of bristles for combing through crossed hangers while the barrel rotates.

It is a further object of the present invention to provide an apparatus that can integrate with an automatic sortation machine to continuously and automatically separate crossed hangers during the sortation process.

BRIEF DESCRIPTION OF THE DRAWINGS

FIG. 1 is a schematic view of the apparatus of the present invention.

FIG. 2 is a schematic view of an alternative embodiment of the invention where the barrel is located above the rail.

DESCRIPTION OF THE INVENTION

Referring to the drawings, in which like numbers represent like parts, FIG. 1 shows an apparatus 10 having an elongated barrel 12, a drive shaft 14, a front end 16 and a rear end 18. The barrel 12 is preferably made of any generally rigid material, such as metal, plastic, wood, ceramic, or the like. A plurality of fingers comprising bristles 20 are fixedly attached to and project radially outward from the barrel 12. The individual bristles can be made of animal hair, plastic, polymer, metal, wood, natural fiber, ceramic or other flexible or rigid material, and attached to the barrel 12 in any conventional manner, such as by glue, pressure fit, or the like. The bristles 20 can be individually spaced around the surface of the barrel 12. Alternatively, the bristles 20 can be arranged in tufts. The bristles 20 can also be molded as part of the barrel 12 itself to form a one piece unit. It is preferable that the bristles 20 be individually smaller in diameter than the diameter of a conventional wire hanger 34 so that the combing action is more easily accomplished.

The bristles 20 can be arranged in any number of configurations, such as but not limited to, rows or rings around the barrel 12, or can be randomly distributed on the surface. In a preferred embodiment, the bristles are arranged in a series of generally parallel spirals from the front end 16 to the rear end 18, as shown in FIG. 1.

The barrel 12 has the shaft 14 extending from preferably the front end. A motor 30 is connected to the shaft 14 by a belt or gear (FIG. 1 shows a belt drive connection) to rotate the barrel about its axis. The motor 30 can be a low torque gear or servo motor. Alternatively, the shaft 14 can be connected to the motor 30 by a universal joint. At each end of the barrel 12 is a bearing 22, which provides a reduced friction connection. The barrel 12 is connected to a conveyor rail 23 comprising an upper rail portion 24 and a lower rail portion 26 at the front end 16 and rear end 18 by the bearings. In a preferred embodiment, the rail 23 has a generally downward sloping portion 28 that accelerates by gravity drop the passing of the hangers 34 to the barrel 12. Alternatively, a conventional screw conveyor may be used in place of the rail 23, which incorporates the apparatus 10 along its length so that the conveyor and the apparatus 10 rotate together. In another embodiment, a belt drive can be employed and the apparatus 10 rotated by connection to a conventional belt. Other connection means are contemplated as being within the scope of the invention. The apparatus 10 can be a snap out section of the rail 23 that engages the drive shaft 14 on one end of the barrel 12 and an idler bearing 22 on the other end.

In operation, a plurality of hangers 20 are passed to the upper rail portion 24. The hangers 34 drop down the curved portion 28 onto the front end 16 of the barrel 12 by gravity. With the motor 30 activated, the apparatus 10 rotates in the direction of the arrow 36, which is in the same direction of the curve from center to tip of the hook of the hanger 34. The bristles 20 comb through the hangers 34 and in the process separate any crossed hangers. In a preferred embodiment, the barrel 12 is placed in a slightly downward angle, with the front end 16 slightly above the rear end 18. In this manner, hangers will move from the front end 16 to the rear end 18 during rotation and travel onto lower rail portion 26 for further processing.

FIG. 2 illustrates an alternative embodiment in which separate apparatus 100 is positioned above the rail 102, rather than being a part of the rail. A barrel 104 containing the bristles 20 is positioned on the side or above the rail 102. The bristles 20 can be in contact with the rail 102. The barrel 104 is disposed between two mounting plates 106 by an axle 108. The axle 108 is connected to a drive shaft 110, which is in turn connected to a motor 30 as described above. The plates 106 and motor 30 can be attached to a base (not shown). The barrel 104 turns in the direction of the arrow 112. Hangers 34 passing on the rail 102 between the barrel 104 are combed by the bristles 20 and separated. This embodiment is useful in retrofitting existing rails and conveyor systems without the expense of replacing a portion of the rail. The apparatus 100 can be conveniently mounted external to the rail and positioned accordingly.

It is understood that the present invention can be used with devices other than wire garment hangers. The separation apparatus of the present invention can be used in other situations where a number of items disposed on a common support means are to be moved to a different point and the items may have the possibility of becoming crossed or tangled.

While the invention has been described in connection with certain preferred embodiments, it is not intended to limit the scope of the invention to the particular forms set forth. On the contrary, it is intended to cover such alternatives, modifications, and equivalents as may be included within the spirit and scope of the invention as defined by the appended claims.

I claim:

1. An apparatus for separating crossed garment hangers in a laundry separation assembly having a first rail portion and a second rail portion, comprising:
   a barrel having a first end and a second end, the first end being connectable to the first rail portion and the second end being connectable to the second rail portion such that when connected the first rail portion, the barrel and the second rail portion form a single unified rail capable of supporting a hanger wherein the connection comprises a set of bearings at each end of the barrel operatively connectable to one end of the first rail portion and the other bearing operatively connectable to one end of the second rail portion such that the barrel can rotate on its axis;
   a plurality of fingers attached to and projecting radially outward around the circumference of the barrel; and
   means for mechanically rotating the barrel comprising a motor operatively connected to the barrel,
   whereby when hangers are fed onto the first rail, the hangers will move toward the rotating barrel and the fingers will comb through the necks of the hangers separating any hangers which are crossed, the separated hangers traveling off the barrel to the second rail portion.

2. The apparatus of claim 1, wherein the motor is connected to the barrel by means selected from the group consisting of a shaft, a belt and a universal joint.

3. The apparatus of claim 1, wherein the fingers are individual bristles composed of a generally stiff material.

4. The apparatus of claim 3, wherein the bristles are composed of a material selected from the group consisting of animal hair, plastic, polymer, metal, wood, natural fiber and ceramic.

5. The apparatus of claim 1, wherein the bristles are positioned around the barrel circumference in a series of generally parallel spirals.

6. The apparatus of claim 1, wherein the bristles are positioned around the barrel circumference in a series of generally parallel rows.

7. The apparatus of claim 1, wherein the bristles are positioned around the barrel circumference in a series of generally parallel rings.

8. The apparatus of claim 1, wherein the bristles are positioned around the barrel circumference in a generally random pattern.

9. The apparatus of claim 1, wherein the fingers are composed of at least one tuft of a plurality of bristles.

10. The apparatus of claim 1, wherein the hangers move from the first rail portion to the barrel by gravity.

11. An apparatus for separating crossed garment hangers in a laundry separation assembly having a rail portion which supports a plurality of hangers, comprising:
    a barrel assembly having a first end, a second end and an axle extending axially therethrough and a plurality of fingers attached to and projecting radially outward around the circumference of the barrel, the barrel assembly being positionable in parallel and in proximity to the rail;
    a means for mounting the barrel in a stable position comprising a first mounting bracket having a first opening defined in one end, the first bracket being operably connected through the first opening to the first end of the barrel axle, and a second mounting bracket having a second opening defined in one end, the second bracket being operably connected through the second opening to the second end of the barrel axle;
    means for mechanically rotating the barrel about the axle comprising a motor operatively connected to the barrel,
    whereby when hangers are moved along the rail, the hangers will move toward the rotating barrel and the fingers will comb through the necks of the hangers separating any hangers which are crossed, the separated hangers then traveling away from the barrel assembly along the rail.

12. The apparatus of claim 11, wherein the motor is connected to the barrel by means selected from the group consisting of a shaft, a belt and a universal joint.

13. The apparatus of claim 11, wherein the fingers are individual bristles composed of a generally stiff material.

14. The apparatus of claim 13, wherein the bristles are composed of a material selected from the group consisting of animal hair, plastic, polymer, metal, wood, natural fiber and ceramic.

15. The apparatus of claim 11, wherein the bristles are positioned around the barrel circumference in a series of generally parallel spirals.

16. The apparatus 11, wherein the bristles are positioned around the barrel circumference in a series of generally parallel rows.

17. The apparatus of claim 11, wherein the bristles are positioned around the barrel circumference in a series of generally parallel rings.

18. The apparatus of claim 11, wherein the bristles are positioned around the barrel circumference in a random pattern.

19. The apparatus of claim 11, wherein the fingers are composed of at least one tuft of a plurality of bristles.

20. A method for separating a plurality of crossed conventional garment hangers in a laundry separation assembly, the assembly including a common hanger support means comprising an elongated rail having a first rail portion and a second rail portion, comprising:

providing a plurality of the hangers;
providing a barrel having
    a first end and a second end, the first end being connectable to the first rail portion and the second end being connectable to the second rail portion such that when connected the first rail portion, the barrel and the second rail portion form a single unified rail capable of supporting a hanger, wherein the connection comprises a set of bearings at each end of the barrel operatively connectable to the ends of the first and second rail portions such that the barrel can rotate on axis,
    a plurality of fingers attached to and projecting radially outward around the circumference of the barrel, and
    means for mechanically rotating the barrel comprising a motor operatively connected to the barrel,
moving a plurality of the hangers onto the first end of the barrel; and
rotating the barrel about the barrel axis in the direction of the hanger curve from neck to tip in such a manner as to interpose a portion of the fingers between any crossed hangers, resulting in the separation of any crossed hangers.

21. A method for separating a plurality of crossed conventional garment hangers in a laundry separation assembly, the assembly including a rail capable of supporting a plurality of hangers, comprising:

providing a plurality of the hangers;
providing an apparatus for separating the hangers, comprising
    a barrel assembly having a first end, a second end and an axle extending axially therethrough and a plurality of fingers attached to and projecting radially outward around the circumference of the barrel, the barrel assembly being positionable in parallel and in proximity to the rail;
    a means for mounting the barrel in a stable position comprising a first mounting bracket having a first opening defined in one end, the first bracket being operably connected through the first opening to the first end of the barrel axle, and a second mounting bracket having a second opening defined in one end, the second bracket being operably connected through the second opening to the second end of the barrel axle, such that both brackets permit rotation of the barrel axle;
    a means for mechanically rotating the barrel about the axle comprising a motor operatively connected to the barrel,
moving a plurality of the hangers along the rail toward the barrel; and
rotating the barrel about the barrel axis in the direction of the hanger curve from neck to tip in such a manner as to interpose a portion of the fingers between any crossed hangers, resulting in the separation of any crossed hangers and the movement of uncrossed hangers along the rail.

* * * * *